United States Patent
Chow (10) Patent No.: US 7,860,722 B1
(45) Date of Patent: Dec. 28, 2010

(54) SYSTEM AND METHOD FOR KEYWORD DETECTION IN A CONTROLLED-ENVIRONMENT FACILITY USING A HYBRID APPLICATION

(75) Inventor: Charles Chow, Coppell, TX (US)

(73) Assignee: Securus Technologies, Inc., Dallas, TX (US)

( * ) Notice: Subject to any disclaimer, the term of this patent is extended or adjusted under 35 U.S.C. 154(b) by 1306 days.

(21) Appl. No.: 11/334,522

(22) Filed: Jan. 18, 2006

(51) Int. Cl.
*G06Q 10/00* (2006.01)

(52) U.S. Cl. .................... 705/1.1; 379/88.1; 379/88.02; 379/88.04

(58) Field of Classification Search ...... 705/1, 705/500; 379/88.02, 88.1, 88.04
See application file for complete search history.

(56) References Cited

U.S. PATENT DOCUMENTS

| | | | |
|---|---|---|---|
| 5,185,781 A | 2/1993 | Dowden et al. | |
| 5,210,789 A | 5/1993 | Jeffus et al. | |
| 5,319,702 A | 6/1994 | Kitchin et al. | |
| 5,345,501 A | 9/1994 | Shelton | |
| 5,485,507 A | 1/1996 | Brown et al. | |
| 5,517,555 A | 5/1996 | Amadon et al. | |
| 5,539,812 A | 7/1996 | Kitchin et al. | |
| 5,627,887 A | 5/1997 | Freedman | |
| 5,655,013 A | 8/1997 | Gainsboro | |
| 5,768,355 A | 6/1998 | Salibrici et al. | |
| 5,796,811 A | 8/1998 | McFarlen | |
| 5,805,685 A | 9/1998 | McFarlen | |
| 5,832,068 A | 11/1998 | Smith | |
| 5,926,533 A | 7/1999 | Gainsboro | |
| 6,064,963 A | 5/2000 | Gainsboro | |
| 6,320,946 B1 | 11/2001 | Enzmann et al. | |
| 6,324,280 B2 | 11/2001 | Dunn et al. | |
| 6,363,065 B1 | 3/2002 | Thornton et al. | |
| 6,397,179 B2 * | 5/2002 | Crespo et al. | 704/242 |
| 6,404,764 B1 | 6/2002 | Jones et al. | |
| 6,405,170 B1 * | 6/2002 | Phillips et al. | 704/270 |
| 6,480,590 B1 | 11/2002 | Ku | |
| 6,487,200 B1 | 11/2002 | Fraser | |
| 6,639,978 B2 | 10/2003 | Draizin et al. | |
| 7,542,902 B2 * | 6/2009 | Scahill et al. | 704/251 |
| 2002/0176403 A1 | 11/2002 | Radian | |

(Continued)

FOREIGN PATENT DOCUMENTS

| | | |
|---|---|---|
| EP | 1175074 | 1/2002 |
| JP | 2002157627 | 5/2002 |

OTHER PUBLICATIONS

U.S. Appl. No. 10/420,585, filed Apr. 22, 2003, McNitt et al.

(Continued)

*Primary Examiner*—Janice A. Mooneyham
*Assistant Examiner*—Heidi Riviere
(74) *Attorney, Agent, or Firm*—Fogarty, L.L.C.

(57) ABSTRACT

A method for keyword detection in a controlled-environment facility comprises capturing a conversation within the controlled-environment facility and executing a hybrid keyword detection application for detecting a keyword spoken during the conversation. A system comprises an audio capture system operable to capture an audio signal within a controlled-environment facility and a hybrid keyword detection system connected to the audio capture system, where the hybrid keyword detection system is operable to detect a keyword.

30 Claims, 4 Drawing Sheets

U.S. PATENT DOCUMENTS

2003/0002639 A1   1/2003   Hie
2003/0185204 A1   10/2003  Murdock
2005/0055213 A1*  3/2005   Claudatos et al. ........ 704/270.1

OTHER PUBLICATIONS

U.S. Appl. No. 10/800,473, filed Mar. 15, 2005, Rae et al.
U.S. Appl. No. 11/125,842, filed May 10, 2005, Keiser et al.

Yu, P. et al., "A Hybrid Word/Phoneme-Based Approach for Improved Vocabulary-Independent Search in Spontaneous Speech", Microsoft Research Asia; 4 pages.

Seide, Frank; et al., "Vocabulary-Independent Search in Spontaneous Speech," IEEE International Conference on Acoustics, Speech, and Signal Processing, 2004, Proceedings, (ICASSP '04), May 17-21, 2004, pp. I-253-6, vol. 1, IEEE.

* cited by examiner

SYSTEM AND METHOD FOR KEYWORD DETECTION IN A CONTROLLED-ENVIRONMENT FACILITY USING A HYBRID APPLICATION

CROSS-REFERENCE TO RELATED APPLICATIONS

This application is related to U.S. Pat. No. 6,064,963, entitled "AUTOMATIC KEY WORD OR PHRASE SPEECH RECOGNITION FOR THE CORRECTIONS INDUSTRY," the disclosure of which is hereby incorporated herein by reference. This application is also related to co-pending and commonly assigned U.S. patent application Ser. No. 11/125,842 filed May 10, 2005, entitled "PROCESSOR-BASED SELF-SERVICE TERMINALS USED WITH RESPECT TO CONTROLLED ENVIRONMENT FACILITIES", Ser. No. 10/420,585 filed Aug. 22, 2003, entitled "SYSTEM AND METHOD FOR DETECTING UNAUTHORIZED CALL ACTIVITY", and Ser. No. 10/800,473 filed Mar. 15, 2004, entitled "CALL PROCESSING WITH VOICE OVER INTERNET PROTOCOL TRANSMISSION", the disclosure of which are hereby incorporated herein by reference.

TECHNICAL FIELD

The following description relates in general to speech recognition and, more particularly, to a system and method for keyword detection in a controlled-environment facility using a hybrid application.

BACKGROUND OF THE INVENTION

Telephone conversations are frequently recorded or otherwise monitored in controlled-environment facilities. In prisons, for instance, such monitoring is important because inmates have been known to orchestrate crimes over the telephone. Generally, a resident's conversations may be recorded or monitored in order to maintain a record for future review, to determine where a resident may be hiding after escaping, to use as evidence in connection with crimes committed, to detect a planned future crime or other activity that is of interest (e.g., riot, escape attempt, suicide attempt, etc.), among other reasons. Unfortunately, authorities can only listen to a fraction of a day's recordings each day. Moreover, this extremely labor intensive task is highly subject to human error. One may misinterpret crucial elements or keywords spoken during a monitored conversation, or miss important conversations altogether. Further, the effectiveness of a human operator in recognizing keywords is limited by the knowledge of the specific human operator as to keywords to listen for, and because the knowledge and experience level may vary from one human operator to the next, so may the effectiveness of the monitoring vary. Also, the use of a human operator in monitoring conversations introduces the possibility of discrimination or biases of the specific human operator impacting the human operator's analysis of the conversations, whether intentional or not.

Meanwhile, automatic speech processing systems have been developed in the art. Conventional speech processing systems commonly employ a speech recognition module, which transforms captured audio signals into discrete representations that are compared to stored digital representations of expected keywords or sounds. Words spoken during a conversation can be recognized by using statistical algorithms or phonetic-based algorithms that measure and detect matches to corresponding keywords. Nevertheless, because different speech recognition applications face different practical challenges, the design of such systems can vary widely according to vocabulary, syntax and, more importantly, the environment where the system is being used. Further, the accuracy of such systems may depend on many factors, and the accuracy may substantially degrade in environments having low audio quality and/or a wide variety of speakers (e.g., with different dialects, accents, slang, etc.) who are not motivated to cooperate in the capture of their conversations. For instance, in certain situations, individuals are motivated to cooperate with a speech recognition system to aid in improving the accuracy of the speech recognition system. In some situations, an individual desiring to utilize a speech recognition system to, for example, transcribe dictation from the individual into a word processor document may "train" the speech recognition system (e.g., by reading aloud certain words, phrases, documents, etc. that are known by the speech recognition system, such that the speech recognition system can adapt its operation to the individual user's specific speaking patterns, dialect, accent, etc.). In many other situations, users are motivated to speak clearly to improve accuracy of the speech recognition systems, such as when users are interacting with a voice response unit (VRU) to navigate a menu presented via a telephony system. Of course, in many environments, such as prisons, the individuals have no motivation to speak clearly or otherwise cooperate to have their conversations accurately processed by the speech recognition system, and may not even be aware that the conversation is being captured and processed by a speech recognition system. Further, prison inmates generally do not cooperate to "train" a speech recognition system. These and other factors substantially increase the difficulty in accurately detecting keywords by a speech processing system in many environments, such as prisons.

BRIEF SUMMARY OF THE INVENTION

In view of the above, a desire exists for a system and method that is capable of accurately recognizing keywords in captured audio, particularly within controlled-environment facilities, such as prisons, where audio quality may be poor and/or speakers are not cooperating with the capture and/or accurate recognition of their conversations. A further desire exists for efficiently processing such captured audio so that keywords may be timely recognized. These and/or other desires are addressed by certain embodiments of the present invention, as described further herein.

Embodiments of the present invention are directed generally to systems and methods for detecting keywords spoken during a conversation that takes place, at least in part, within a controlled-environment facility. The term "conversation," as used herein, includes not only verbal exchanges but also single spoken events. A "controlled-environment facility" may be, for example, a correctional facility (municipal jail, county jail, state prison, federal prison, military stockade, juvenile facility, detention camp, etc.), a hospital, a nursing home, mental institution, rehabilitation facility (e.g., a rehabilitation facility treating drug addiction, alcohol addiction, gambling addiction, and/or diseases/addictions), a hotel, a resort, a camp, and the like. Certain controlled-environment facilities may be thought of as a small community or city, perhaps gated or otherwise access restricted, wherein various activities occur within the community and between the community and those outside the community in the daily operation thereof. Such communities may include a number of individuals and enterprises directly associated therewith, including management, staff, inmates, residents, patients, or guests (referred to as "residents"), and a number of individuals and enterprises indirectly associated therewith, including friends and family of residents, inmates, vendors, government agencies, providers of services to residents, and individuals with a connection to the facility or its residents (referred to as "non-residents"). While various exemplary embodiments are described herein with reference to the detection of a keyword spoken during a telephony conversation between residents and/or non-residents of correctional facilities (e.g., prisons), the concepts presented herein may be likewise applied to other services and/or within other controlled-environment facilities.

Certain embodiments of the present invention employ a hybrid keyword detection system to detect, recognize, or identify keywords that are present in captured audio. In general, a hybrid keyword detection system (or algorithm) refers to one that uses a combination of a plurality of different models in its operation. In certain embodiments of the present invention, a hybrid keyword detection system (or algorithm) uses a combination of at least a phonetic model and an acoustic model in its operation for detecting keywords in captured audio. Such hybrid keyword detection technique may be employed in a system, such as the exemplary speech recognition system described in U.S. Pat. No. 6,064,963, entitled "AUTOMATIC KEY WORD OR PHRASE SPEECH RECOGNITION FOR THE CORRECTIONS INDUSTRY," the disclosure of which is hereby incorporated herein by reference. The hybrid keyword detection technique may be employed instead of or in supplement to the technique described in U.S. Pat. No. 6,064,963, for example.

The term "keyword," as used herein, includes any sound or combination of sounds in the form of a spoken word, phrase, or utterance that conveys a message in any language. In addition, the term "keyword" may also refer to the representation of a sound or combination of sounds, for example, in written form or electronic format. For example, if authorities of a particular controlled-environment facility, such as a prison, decide to monitor and scan conversations which may involve a murder, some of the relevant keywords may include: assassinate, butcher, chill, cool, destroy, dispatch, drub, eliminate, eradicate, execute, exterminate, extinguish, finish, hang, hit, ice, knife, liquidate, shoot, slay, smother, snuff, spoil, strangle, thrash, waste, destroy, dissolve, do away with, eliminate, end, eradicate, erase, finish, kill, nix, quash, scrub, squelch, terminate, and zap, among others.

Embodiments of the present invention may be utilized to detect any keyword spoken in any environment. However, as described further herein, embodiments of the present invention are particularly suited for application within controlled-environment facilities. For instance, according to certain embodiments, techniques are provided that use a hybrid keyword detection algorithm to improve accuracy and/or efficiency of detecting keywords in audio captured in such controlled-environment facilities. It should be appreciated that, as described further herein, such controlled-environment facilities are different than many other environments in which speech recognition systems may be employed and present unique conditions to be addressed for accurately and efficiently processing captured audio for detecting keywords.

Generally, conversations that take place within controlled-environment facilities have unique characteristics which make keyword detection very difficult. For instance, these conversations can be very emotional, switching rapidly between low and high volumes with varying pauses in between, thus resulting in unpredictable speech patterns. Furthermore, residents may intentionally speak in such a way so as to attempt circumventing speech recognition. Accordingly, preferred embodiments of the present invention implement "speak independent" technologies in the form of a hybrid keyword detection system. An exemplary hybrid algorithm that may be utilized in the hybrid keyword detection system of an embodiment of the present invention is described by Peng Yu and Frank Seide in "A HYBRID WORD/PHONEME-BASED APPROACH FOR IMPROVED VOCABULARY-INDEPENDENT SEARCH IN SPONTANEOUS SPEECH," International Speech Communication Association, October 2004, the disclosure of which is hereby incorporated herein by reference. Of course, other hybrid algorithms now known or later developed may be used in embodiments of the present invention. As described further herein, such a hybrid algorithm may be advantageously employed to significantly improve the efficiency and accuracy of keyword detection in controlled-environment facilities.

In one embodiment, a conversation is captured within a controlled-environment facility, and a hybrid keyword detection application is used to identify whether a particular keyword was—or is being—spoken during the conversation. The captured conversation may be a recorded conversation or a live, ongoing conversation scanned in real-time. Moreover, the captured conversation may take place between a resident and a non-resident, for example, over a telephone call. Alternatively, the captured conversation may take place entirely within the facility, for example, between two residents that share a jail cell, that occupy adjacent or nearby cells, or that are in a common area such as a cafeteria or the like.

In one embodiment, an audio capture system is employed to capture an audio signal within a controlled-environment facility. Such audio capture system may be part of a telephony system or may otherwise comprise a microphone for capturing audio, as examples. A hybrid keyword detection system is connected to the audio capture system, where the hybrid keyword detection system is operable to detect keyword(s) in the captured audio signal. The captured audio may be stored by the audio capture system (e.g., to a data storage device) and later analyzed by the hybrid keyword detection system, or the captured audio may be fed in substantially real-time (e.g., as it is captured) to the hybrid keyword detection system for analysis thereby.

Certain embodiments of the present invention allow a user to adapt or customize a keyword detection application to a particular controlled-environment facility. For instance, an administrator may tune the keyword detection application for a particular geographic region in which the controlled-environment facility is located and/or from which a majority of the controlled-environment facility's residents originate. As another example, a range of keywords, including slang, accents, dialects, and/or speech patterns, specific to a particular environment, may be defined to aid in tuning the keyword detection application for the particular environment. In addition, detection modules within the keyword application may be localized so as to maximize performance by taking speech characteristics such as, for example, a particular accent, into consideration.

In certain embodiments, specified action(s) may be associated with corresponding keyword(s) so that, upon detection of a keyword, a corresponding action is taken. For instance, an administrator may specify to the speech processing system that if a particular keyword is detected, a specified action should be triggered. For example, the administrator may specify that upon the particular keyword being detected, the system is to contact (e.g., call, email, page, etc.) one or more officials to notify them of the detected keyword. An another example, the detection of a particular keyword may trigger for the captured audio to be stored to a data storage device (e.g., possibly along with information about the captured audio, such as the date and time of its capture, the individuals involved in the conversation, etc.) for preservation (e.g., as evidence). As still another example, upon the speech processing system detecting a keyword, in substantially real-time, in an ongoing conversation (e.g., a telephone call), the speech processing system may contact an official and patch the official to eavesdrop on the conversation. In this manner, the official need not monitor all conversations, but may be patched in to monitor conversations once the speech processing system detects a particular keyword. In certain embodiments, the administrator may define rules, which may specify actions that are to be taken and/or otherwise manage the processing of captured audio and/or responsive actions. For example, the administrator may specify that if a particular keyword is detected as spoken by a particular individual speaker, then trigger a certain action, whereas the action is not triggered if the keyword is detected as spoken by a different speaker. Furthermore, certain embodiments of the present invention may allow screening and/or selection of specific conversations by party (e.g., resident), telephone number, location, date, time, or any other parameter. Thus, the speech processing system may selectively choose (e.g., based on parameters defined by an administrator) which conversations to capture and/or analyze for detecting keywords.

Certain embodiments of the present invention also provide a scalable keyword detection system. One embodiment of the present invention comprises a centrally-located hybrid keyword detection server connected to each of a plurality of geographically distributed controlled-environment facilities via a computer network, thereby greatly reducing the costs that would otherwise be associated with a detection system within each of the plurality of facilities. Of course, in other embodiments all or part of the hybrid keyword detection system may be employed locally within a controlled-environment facility.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
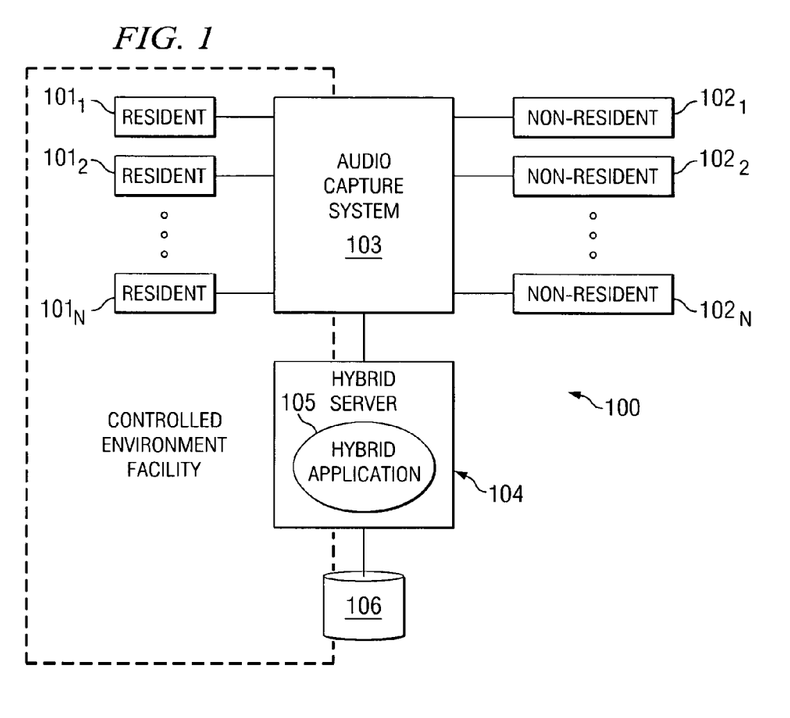
FIG. 1 shows an exemplary block diagram of one embodiment of the present invention.

FIG. 1 shows a block diagram of one embodiment of the present invention. In the exemplary embodiment of FIG. 1, system 100 comprises an audio capture system 103 connected to a hybrid keyword detection server 104. Audio capture system 103 may comprise a microphone or other suitable device for capturing audio. In certain embodiments, audio capture system 103 may also comprise a data storage device for storing (or buffering) captured audio. Hybrid keyword detection server 104 may comprise any suitable processor-based device (e.g., personal computer, mainframe computer, laptop computer, etc.) that is operable to receive captured audio from audio capture system 103 and execute hybrid application 105 to detect keyword(s) in such captured audio. Hybrid keyword detection server 104 is connected to storage 106, which may comprise any suitable data storage mechanism now known or later developed, such as memory (e.g., random access memory (RAM)), a hard disk, optical disk, magnetic disk, tape drive, etc.

In certain embodiments, audio capture system 103 is located entirely within a controlled-environment facility. For instance, audio capture system 103 may comprise one or more microphones that is/are arranged in a controlled-environment facility for capturing audio within the facility. In other embodiments, audio capture system 103 is located external to such controlled-environment facility. For instance, audio of telephone calls may be routed through a device that is external to the controlled-environment facility, and the audio capture system may be employed in such external device for capturing audio of the telephone calls. In certain embodiments, a first part of the audio capture system may be arranged in the controlled-environment facility and a second part of the audio capture system may be arranged external to the controlled-environment facility. Any such configuration is intended to be within the scope of the present invention.

Similarly, hybrid keyword detection server 104 and/or storage 106 may be placed anywhere within system 100. That is, hybrid keyword detection server 104 and/or storage 106 may be arranged within the controlled-environment facility, external to the controlled-environment facility, or partially in and partially external to the controlled-environment facility. In this example, residents $101_1$, $101_2$, ..., $101_N$ (collectively referred to as residents 101) are inside the facility, whereas non-residents $102_1$, $102_2$, ..., $102_N$ (collectively referred to as non-residents 102) are outside the facility. Audio capture system 103 is operable to capture conversations taking place between residents 101 and/or between residents 101 and non-residents 102. While this example shows non-residents 102 as external to the controlled-environment facility, it should be recognized that in some instances the non-residents may visit the controlled-environment facility, during which time conversations between the non-residents and/or residents occurring within the facility may be captured and analyzed in accordance with embodiments of the present invention.

In one embodiment, audio capture system 103 comprises a set of audio capture devices (e.g., microphones) which may be placed, for example, within rooms, cells, hallways, and common areas of the controlled-environment facility. For instance, audio capture devices may comprise a set of microphones connected to a multi-channel data acquisition system. In another embodiment, audio capture system 103 may be implemented within a telephone control system that selectively taps into a telephone line for monitoring and/or recording an audio signal. The exemplary techniques for capturing audio described in U.S. Pat. No. 6,064,963 entitled "AUTOMATIC KEY WORD OR PHRASE SPEECH RECOGNITION FOR THE CORRECTIONS INDUSTRY," the disclosure of which is hereby incorporated herein by reference, may be employed in certain embodiments of the present invention.

Hybrid keyword detection server 104 may be a standard computer, server, laptop, or the like, and is capable of executing hybrid keyword detection application 105. In operation of one embodiment, hybrid keyword detection server 104 controls audio capture system 103 and selects a channel or line for the monitoring and/or recording of an audio signal. Channel/line selection can be accomplished by various ways of communication between hybrid keyword detection server 104 and audio capture system 103. Audio capture system 103 may send a message to hybrid keyword detection server 104 when an event occurs, wherein various events may trigger such a message, such as certain channels/lines of a phone going offhook/onhook, an inmate initiating a call, call setup, called party accepting a call, a particular keyword being detected, etc. Audio capture system 103 can also log events into data storage, such as a database, and hybrid keyword detection server 104 may monitor the changes on events updated by the audio capture system 103 for channels/lines selection, and to trigger corresponding actions.

Hybrid keyword detection server 104 receives a conversation embodied in an audio signal captured by audio capture system 103, and may store an electronic copy of the received conversation in storage 106, which may be stored as a file, database, or other type of data structure. Hybrid keyword detection application 105 uses a hybrid algorithm to detect keyword(s) spoken during the ongoing or recorded conversation embodied in the audio signal. An example of such a hybrid algorithm that may be employed by hybrid keyword detection application 105 in accordance with one embodiment of the present invention is the hybrid algorithm described by Peng Yu and Frank Seide in "A HYBRID WORD/PHONEME-BASED APPROACH FOR IMPROVED VOCABULARY-INDEPENDENT SEARCH IN SPONTANEOUS SPEECH," International Speech Communication Association, October 2004, the disclosure of which is hereby incorporated herein by reference. Of course, other hybrid algorithms now known or later developed may be used in embodiments of the present invention. If a keyword is detected in the captured audio, hybrid keyword detection server 105 may trigger an appropriate action specified for the detected keyword. For instance, keywords that are of interest, as well as associated actions to be triggered and/or rules that may be specified by an administrator may be stored to data storage 106, which is accessible by hybrid keyword detection application 105.

In general, a hybrid keyword detection system (or algorithm) refers to one that uses a combination of a plurality of different models in its operation. In certain embodiments of the present invention, a hybrid keyword detection system (or algorithm) uses a combination of at least a phonetic model and an acoustic model in its operation for detecting keywords in captured audio. In general, a phonetic model is a model that focuses on phonemes, which are the smallest units of significant sound in a language, such as "b" in "bag" or "m" in "mute". A phonetic model allows searches on how word and subword actually sound, thus provides a specialized way of keyword detection. An acoustic model, on the other hand, is a model that utilizes traditional Digital Signal Processing (DSP) and statistical methods to perform keyword detection. Artificial Intelligence (AI) techniques, such as a rule-based expert system combined with DSP and statistical methods, are widely used to implement an acoustic model.

In general, a hybrid algorithm utilizes a two-path approach for keyword detection. The first path focuses on a phonetic model, while a second path focuses on an acoustic model. An advantage of utilizing a phonetic model is performance. A high-speed phonetic-based algorithm is capable of searching 36,000 times faster than real time. However, such a phonetic-based algorithm, alone, does not provide a level of accuracy desired for many applications (e.g., resulting in false-positive matches), especially for words with few phonemes. On the other hand, an acoustic model can markedly improve the accuracy of keyword detection, but at a cost of performance degradation. By combining both use of a phonetic model and an acoustic model into a hybrid algorithm, a high level of both performance and accuracy can be provided.

Since a predefined keyword list only contains a limited number of keywords, one embodiment of the hybrid algorithm utilizes the first path that performs a phonetic model-based analysis to quickly isolate a portion of captured audio that such analysis detects as containing keyword(s). Thus, the phonetic-based analysis can quickly identify those ongoing or recorded conversations that potentially contain keyword(s) of interest. Often, a relatively small group of ongoing or recorded conversations may contain keyword(s), and the phonetic-based analysis acts as a quick analysis to filter out those conversations that potentially contain keywords.

As mentioned above, the phonetic-based analysis is often not as accurate as desired, sometimes resulting in false-positive matches, and so the hybrid algorithm further uses an acoustic-based analysis of those conversations detected by the phonetic-based analysis as potentially containing keywords. In this embodiment, the hybrid algorithm utilizes the second path to further analyze those conversations filtered out by the phonetic-based analysis as potentially containing keywords to verify that such keywords are present in the conversation, using the more accurate acoustic model-based analysis. Thus, the second path utilizing the acoustic-based analysis effectively eliminates false-positive matches in the conversations detected as having keywords by the phonetic-based analysis, thereby increasing the overall accuracy of the keyword detection.

It should be recognized that use of a hybrid algorithm for keyword detection is particularly advantageous for application with a controlled-environment facility, such as a correctional facility, wherein it is desirable to analyze a large amount of captured audio efficiently for detecting keywords with a high level of accuracy. The hybrid algorithm not only provides high performance that is desirable for controlled-environment facilities which may have thousands of hours of inmate conversations captured (e.g., recorded) on a daily basis, but also improves the keyword detection accuracy above a solution that is based solely on phonetic-based analysis.

Figure 2:
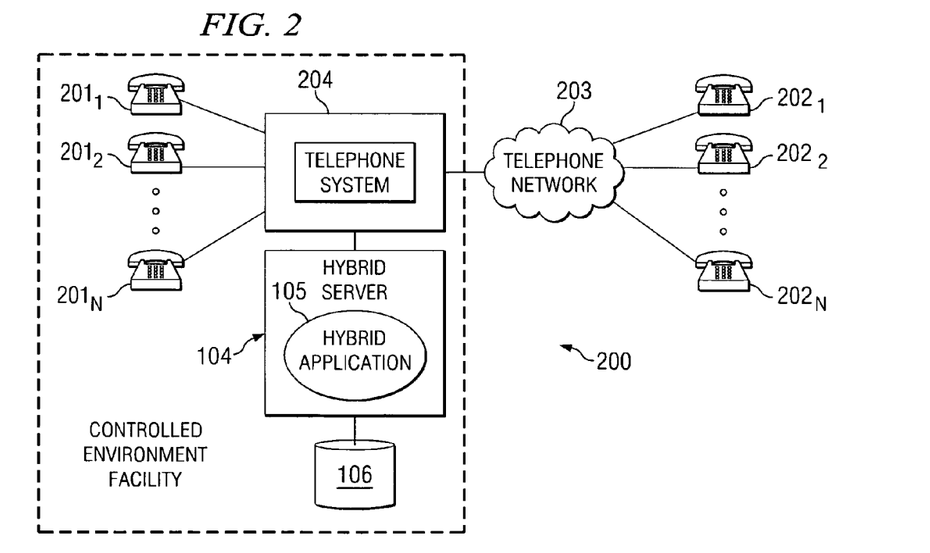
FIG. 2 shows an exemplary embodiment of the present invention used with a controlled-environment facility telephone system.

FIG. 2 shows an exemplary block diagram of a system 200 according to one embodiment of the present invention. In the example of FIG. 2, an embodiment of the present invention is adapted for use with a controlled-environment facility telephone system 204. In this embodiment, audio capture system 103 (of FIG. 1) is implemented within telephone system 204 for capturing audio communicated through such telephone system 204. Hybrid keyword detection server 104 is communicatively coupled to the controlled-environment facility's telephone system 204 such that captured audio is communicated from telephone system 204 to hybrid keyword detection server 104 for processing by hybrid keyword detection application 105. Residents of the controlled-environment facility may use internal telephones $201_1, 201_2, \ldots, 201_N$ (collectively referred to as internal telephones 201) to communicate with non-residents using external telephones $202_1, 202_2, \ldots, 202_N$ (collectively referred to as external telephones 202). External telephones 202 are operable to connect to internal telephones 201 via telephony network 203 and telephone system 204. Telephone system 204 may manage calls to/from the controlled-environment facility, including billing an appropriate party for the calls, determining whether to permit a call (e.g., a call may be blocked if placed to a particular party, such as a victim of a crime committed by the resident attempting the call, and/or a call may be blocked if the callers and/or called party's credit score is insufficiently low, etc.).

The term "network," as used herein, refers generally to typical infrastructure and components of a telecommunications network, such as base stations, mobile switching centers, switching and control networks, and any other related gateways, nodes or elements, including Home Location Registers (HLRs), Visitor Location Registers (VLRs), Signaling Control Points, message centers, and the like. In one embodiment, telephony network 203 comprises a public-switched telephony network (PSTN). Of course, all or a part of such telephony network may comprise a wireless network, the Internet (e.g., for carrying voice-over-IP (VoIP)), and/or other communication networks now known or later developed.

Telephone system 204 may comprise a call management application for selectively tapping into a telephone line. Alternatively, the telephone line may be selected under control of hybrid keyword detection server 104. In this case, hybrid keyword detection server 104 communicates with telephone system 204 in order to select the telephone line for monitoring. Such telephone line may be selected based, for example, on rules specified by an administrator, which may be stored to data storage 106.

In operation, hybrid keyword detection server 104 receives a telephone conversation captured by telephone system 204, and may store an electronic copy of the received telephone conversation in storage 106. Further, in accordance with embodiments of the present invention, hybrid keyword detection application 105 uses a hybrid algorithm to detect any keyword(s) in the captured audio. When a keyword is detected, hybrid keyword detection server 105 may take appropriate action such as, for example, alert the authorities, drop the call, or patch an authority onto an ongoing conversation in real-time. As mentioned above, rules may be entered by an administrator defining the appropriate actions to be triggered when a keyword is detected and/or other conditions are satisfied (e.g., the keyword is spoken during a call to which a specified resident is a party, etc.).

Figure 3:
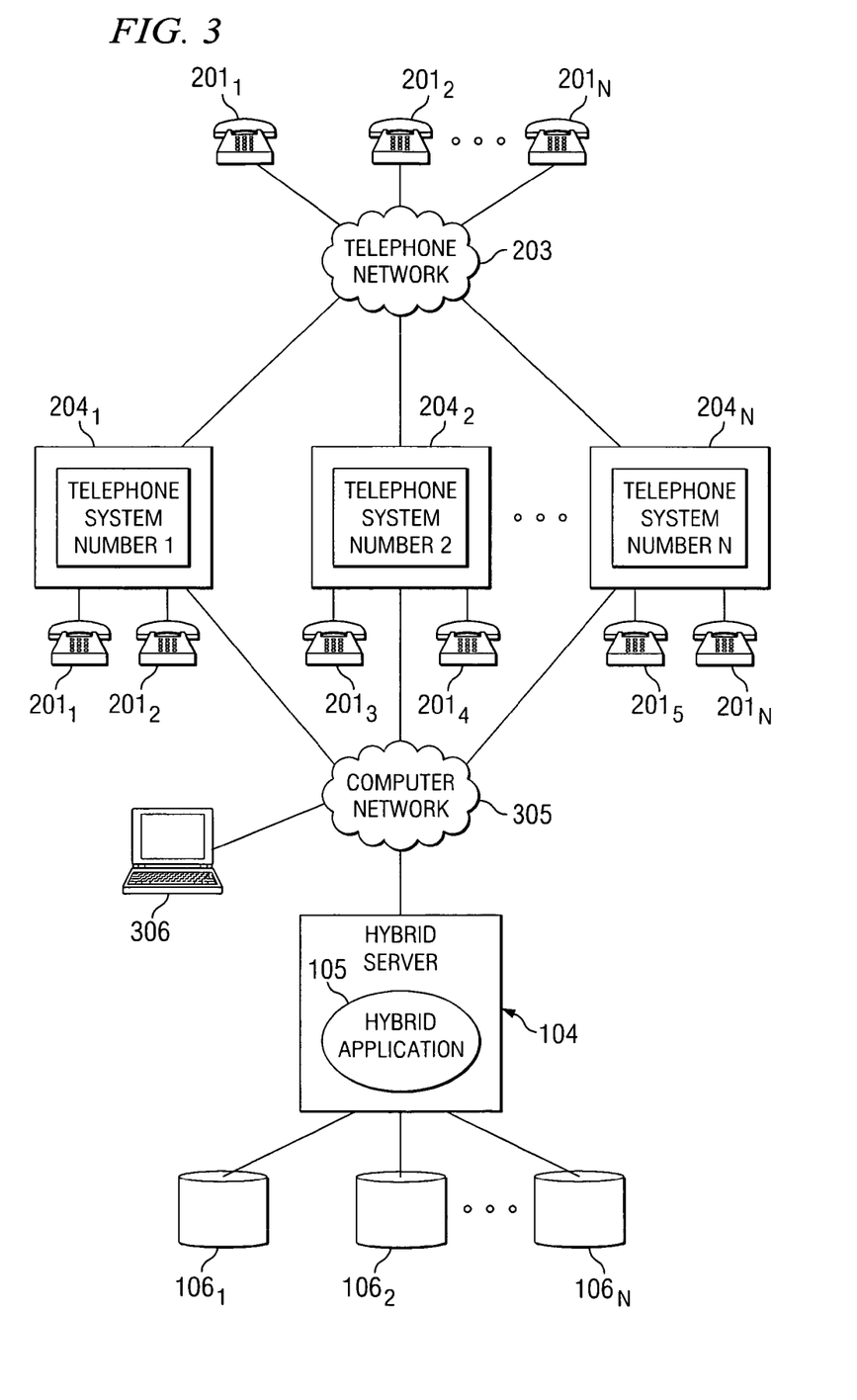
FIG. 3 shows an exemplary embodiment of the present invention connected to a plurality of geographically distributed controlled-environment facilities.

FIG. 3 shows an exemplary embodiment of the present invention connected to a plurality of geographically distributed controlled-environment facilities. Each controlled-environment facility comprises a respective telephone system, shown as telephone systems $204_1, 204_2, \ldots, 204_N$ (collectively referred to as telephone systems 204) in this example, which are coupled to telephony network 203 and to computer network 305. Of course, while telephony network 203 and computer network 305 are shown separately in this example for ease of illustration and discussion, it should be understood that telephony network 203 and computer network 305 may, in some embodiments, be one and the same.

In the exemplary embodiment of FIG. 3, hybrid keyword detection server 104 can communicate with each of telephone systems 204 via computer network 305. Further, one or more client computers 306, such as a personal computer, server, laptop computer, personal digital assistant (PDA), mobile phone, or other processor-based device, can communicate with hybrid keyword detection server 104 via computer network 305. In this manner, an administrator may input keywords, rules, and/or otherwise manage the configuration of hybrid keyword detection application 105 for one or more controlled-environment facilities via client computer 306.

Computer network 305 may be any suitable communication network now known or later developed, including without limitation a local area network (LAN), public-switched telephony network, the Internet or other wide area network (WAN), a wireless network (e.g., IEEE 802.11b (WiFi), General Packet Radio Service (GPRS), Universal Mobile Telecommunications Service (UMTS), Personal Communications Service (PCS), Global System for Mobile communications (GSM), Digital-Advanced Mobile Phone Service (DAMPS), Interim Standard (IS)-136, IS-95, Code Division Multiple Access (CDMA) 2000, Wide-band CDMA (W-CDMA), or Universal Mobile Telecommunications Service (UMTS) standards, or any other Personal Communications Services (PCS), Time Division Multiple Access (TDMA) or CDMA wireless network), or any combination thereof. Furthermore, any type of transport protocol may be used in the communication among hybrid keyword detection server 104, client 306, and telephone system 204 including, for example, Transmission Control Protocol (TCP), User Datagram Protocol (UDP), Stream Control Transmission Protocol (SCTP), or the like.

In one embodiment, computer network 305 may be, for example, the Internet, and a Voice over Internet Protocol (VoIP) or the like may be used for sending an audio file or a streaming audio file containing a telephone conversation from telephone system 204 to hybrid keyword detection server 104. Upon receiving the captured conversation, hybrid keyword detection server may store an electronic file in one of storage devices $601_1, 601_2,$ and $601_N$ (collectively referred to as storage device(s) 601). Each of the storage devices 601 may be owned or otherwise associated with a particular controlled-environment facility. As described above, hybrid keyword detection application 105 may be used to detect a keyword spoken during an ongoing or a recorded conversation.

According to certain embodiments of the present invention, a hybrid keyword detection algorithm leverages extremely well in a centralized location to handle keyword detection for facilities On a VoIP network. For example, in one embodiment, captured audio streams are communicated over VoIP to hybrid keyword detection server 104 along with metadata, such as, originating ANI, called party ANI, inmate PIN, etc in a predefined data structure. With its high performance power, the hybrid system can effectively process multi-channel audio streams, and generate accurate results to deliver to end users at their discretion without delay. Significant cost savings on hardware and maintenance can be recognized by implementing such a hybrid system in a centralized location with VoIP. It will be appreciated that in such an implementation the controlled-environment facility does not have to deal with hardware, storage space, and software maintenance, but instead provides a line to connect to a VoIP network for communicating captured audio and accompanying metadata to hybrid keyword detection server 104.

In an alternative embodiment, one or more of the controlled-environment facilities may select, record, and store a telephone conversation on a local database system (not shown) within the premises. In such case, hybrid keyword detection server 104 may communicate with local database systems within each controlled-environment facility in order to receive recorded conversations that have been locally stored.

It will be appreciated by a person of ordinary skill in the art that this embodiment may greatly reduce the costs that would otherwise be associated with having an entire keyword detection systems within each controlled-environment facility. Another advantage of this embodiment is that it allows remote control and configuration of hybrid keyword detection server 104. For instance, client 306 may communicate with hybrid keyword detection server 104 and configure hybrid keyword detection application 105 via computer network 305. Yet another advantage this embodiment is that it allows the use of metadata or tags for identifying, indexing, filtering, and/or selecting ongoing or recorded conversations to be monitored or scanned. The VoIP may carry both data stream with embedded metadata and a corresponding captured audio stream to a VoIP application server for processing. In one embodiment, the metadata is delivered with a corresponding data stream having call information stored in a predefined data structure. Upon receiving the data stream and audio stream, the hybrid keyword detection server can have metadata on hand while running keyword detection for ongoing or recorded conversations. The keyword detection results can also be stored as part of metadata in a data stream for further processing—e.g., either deliver to an end user or to be archived to a destination on the network or an offline storage space for future retrieval/analysis.

Of course, in other embodiments, all or a portion of the hybrid server 104 and/or storage systems 106 may be implemented at each individual controlled-environment facility. Further, even when implemented fully or partially at an individual controlled-environment facility, remote control and configuration of the hybrid keyword detection server 104 may be supported. For instance, client 306 may communicate with the hybrid keyword detection server 104 and configure hybrid keyword detection application 105 via computer network 305, irrespective of whether the hybrid keyword detection server 104 is implemented fully or partially at a controlled-environment facility.

Figure 4:
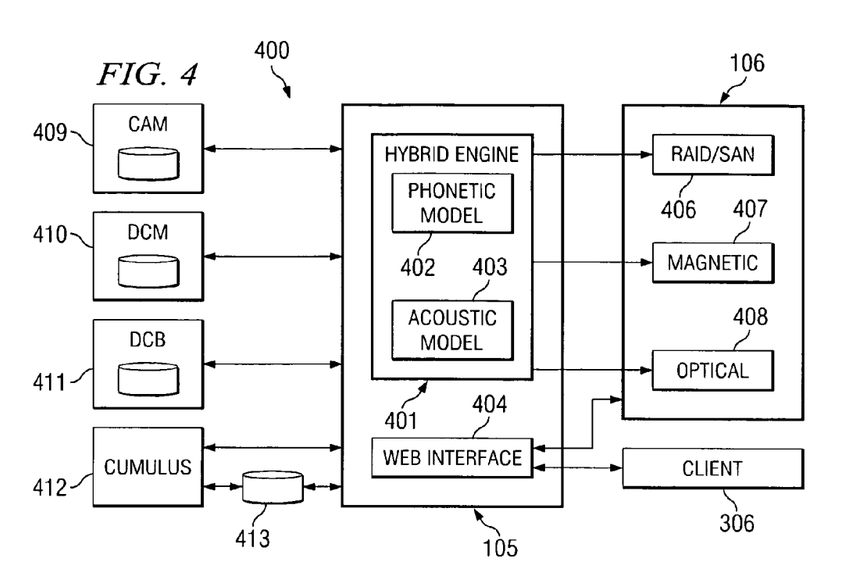
FIG. 4 shows an exemplary hybrid keyword detection application in accordance with one embodiment of the present invention.

FIG. 4 shows an exemplary block diagram of one embodiment of hybrid keyword detection application 105. Hybrid keyword detection application 105 may be implemented as software code that is executable by hybrid keyword detection server 104 (FIG. 1). In this exemplary embodiment, hybrid keyword detection application 105 comprises hybrid engine 401 and web interface 404. This exemplary embodiment further comprises Call Application Manager (CAM) 409, Digital Call Manager (DCM) 410, and Digital ComBridge (DCB) 411, which are premise-based calling platforms commonly implemented in correctional facilities. Computers with telephony boards are physically installed at these facilities for inmates to make calls. The hybrid keyword detection server 104 is also placed at each facility side-by-side with these calling platforms or over a local area network (LAN) with very limited distance, in this exemplary embodiment. The ongoing or recorded conversations are communicated to the hybrid keyword detection server 104 (e.g., over the LAN) for processing.

As also shown, in other embodiments, cumulus system 412, 413 may be included in addition to or instead of the calling platforms 409-411. Cumulus system 412, 413 is a VoIP network based calling platform. With such cumulus system, no computers with telephony boards are needed at the facilities, and all calls go through the VoIP network. VoIP servers, such as application servers or media servers, in a centralized location will handle all calls. Hybrid keyword detection server 104 may also be located in a centralized location to do keyword detection for a plurality of different facilities (e.g., that each have cumulus system 412, 413 implemented), wherein the centralized keyword detection server 104 processes incoming audio streams and corresponding data streams received from the facilities over the VoIP network.

Thus, hybrid engine 401 executes a hybrid keyword detection algorithm to detect keyword(s) that are present in received audio. The captured audio may be stored to a file in storage 106. Storage 106 may comprise a Redundant Array of Independent (or Inexpensive) Disks/Storage Area Network (RAID/SAN), magnetic data storage devices (e.g. tape drives) and/or an optical data storage devices (e.g. compact disk or digital versatile disk drives). The captured audio may be stored to data storage 106, and then later retrieved therefrom for analysis by hybrid keyword detection application 105. Alternatively, the captured audio may be communicated in real-time to hybrid keyword detection application 105 for analysis thereby, and hybrid keyword detection application 105 may then store (e.g., selected ones or portions) of the analyzed captured audio data to data storage 106 for preservation (e.g., as evidence). Furthermore, client 306 may utilize web interface 404 to control the operation of hybrid keyword detection application 105. For instance, web interface 404 may provide an interface to enable an administrator to input keywords, rules, and/or other information for managing the speech processing system of one or more controlled-environment facilities.

Hybrid engine 401 comprises a phonetic model 402 and an acoustic model 403, which are used in analyzing captured audio for performing keyword detection. Acoustic model 403 may allow the scanning of a conversation, word-by-word, and transcribe it into text according to a configurable vocabulary. Phonetic model 402 may index phoneme lattices and quickly search spontaneous speech independently of the vocabulary. Because phonetic model 402 typically yields low miss rates whereas acoustic model 403 yields few false alarms, embodiments of the present invention advantageously combine use of these two models within hybrid engine 401 into a hybrid algorithm. For instance, executing a phonetic model 402 based search may quickly yield a number of possible keyword matches within the conversation, albeit with false alarms among those possible matches. Hence, an acoustic model 403 based search may be subsequently executed in order to determine which of those possible matches indeed is a valid match. However, other hybrid algorithms that combine use of phonetic, acoustic, and/or other models, may be used in other embodiments, and any such hybrid algorithms now known or later developed are intended to be within the scope of the present invention.

In certain embodiments of the present invention, executing the hybrid keyword detection application 105 comprises initiating a hybrid algorithm that performs a phonetic model 402 based search, performs an acoustic model 403 based search, and combines a result from the phonetic model 402 based search and another result from the acoustic model 403 based search into a keyword matching probability. When the keyword matching probability is greater than a threshold, the algorithm indicates that the keyword detection has been successful and a match has been found. In other embodiments of the present invention, executing the hybrid keyword detection application 105 comprises initiating a hybrid algorithm that combines phonetic model 402 and acoustic model 403 into a hybrid model, and performs a hybrid model based search to determine a keyword matching probability. Again, when the keyword matching probability is greater than a threshold, it indicates that a match has been found.

Hybrid keyword detection application 105 is particularly advantageous when used in controlled-environment facilities, and may be customized for a particular controlled-environment facility. For example, slang words commonly used in the particular controlled-environment facility may be defined by a system administrator. Also, phonetic and acoustic models 402, 403 may be localized for maximizing performance by taking speech characteristics typical of the particular controlled-environment facility, such as a specific accent, into consideration. Moreover, the increased performance afforded by hybrid keyword detection may improve the detection of keywords in controlled-environment facilities where conversations typically result in unpredictable speech patterns, and where residents frequently attempt circumventing speech recognition.

In one embodiment, hybrid keyword detection application 105 comprises a set of phonetic and acoustic models 402, 403, where each model is localized and/or customized for a particular controlled-environment facility. Therefore, in a geographically distributed implementation such as the one depicted in FIG. 4, each controlled-environment facility may utilize its own phonetic model 402, acoustic model 403, and/or hybrid algorithm when executing hybrid keyword detection application 105. For instance, hybrid keyword detection application 105 may examine the metadata of an incoming audio file or streaming audio file and automatically determine which of telephone systems 204 originated the conversation. Accordingly, hybrid keyword detection application 105 may use corresponding models and/or algorithm specifically "tuned" for that particular controlled-environment facility when scanning the conversation.

Figure 5:
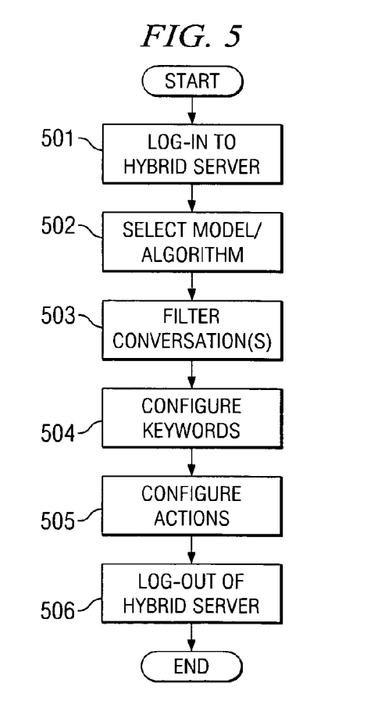
FIG. 5 shows an exemplary operational flow diagram for configuring a hybrid keyword detection system in accordance with one embodiment of the present invention.

FIG. 5 shows an operational flow diagram for configuring a hybrid keyword detection system in accordance with one embodiment of the present invention. In operational block 501, a controlled-environment facility authority or operator logs into hybrid keyword detection server 104. For instance, the operator may use client 306 to access, from a remote location, web interface 404 of hybrid keyword detection application 105 being executed by hybrid keyword detection server 104. Using web interface 404 in block 502, the operator may select which of the available phonetic models 402, acoustic models 403, and/or hybrid algorithms will be used in the keyword search(es). In block 503, the operator may create filtering criteria for selecting which conversations will be scanned for keywords. For example, if the operator knows which residents should be investigated, the filtering criteria may scan conversations originating from a suspicious resident or telephone number, a call placed to a suspicious called party or telephone number, a day or time when suspicious calls usually take place, etc. In block 504, the operator may create or modify a word list that contains the keywords to be detected during the conversation. The operator may also configure actions to be taken upon detection of keywords in block 505. Finally, in block 506, the operator logs out of hybrid keyword detection server 104. The hybrid keyword detection server 104 then operates in accordance with this configuration for the respective controlled-environment facility(ies) for which the configuration is specified by the operator as applying.

Figure 6:
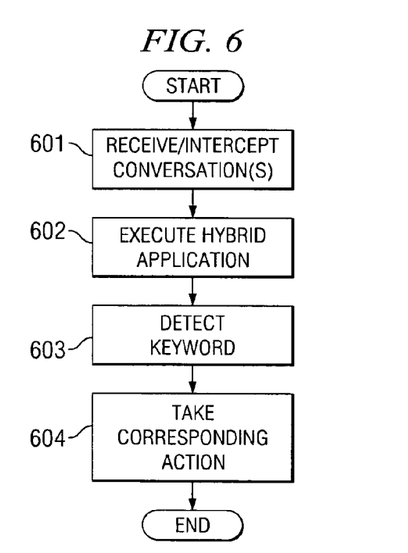
FIG. 6 shows an exemplary operational flow diagram of a hybrid keyword detection system in accordance with one embodiment of the present invention.

FIG. 6 shows an operational flow diagram for one embodiment of the hybrid keyword detection system. In operational block 601, hybrid keyword detection server 104 receives or otherwise intercepts captured audio of a conversation taking place, at least in part, within a controlled-environment facility. The conversation may have been filtered or selected for monitoring within the controlled-environment facility, or it may be so filtered by hybrid keyword detection server 104 in response to a filtering criteria created by an operator, as examples, and the audio of such conversation is captured by one or more audio capture systems 103. Hybrid keyword detection server 104 executes hybrid keyword detection application 105 in block 602 to process the captured audio to detect any keywords that are present therein. In one embodiment, hybrid keyword detection application 105 comprises a phonetic model 402, acoustic model 403, and/or hybrid algorithm that has been pre-selected by the operator. Thus, such phonetic model 402 and acoustic model 403 are used in processing the captured audio for detecting any keywords that are present in the captured audio. If a keyword is detected in block 603, hybrid keyword detection server 104 may take appropriate action in block 604. In certain embodiments, hybrid keyword detection server 104 may alert authorities about the conversation and/or detected keyword(s), may patch a live, ongoing conversation to the authorities, and/or may store the conversation in storage 106 for future review, as examples. As mentioned above, such actions may be defined by an administrator when configuring the hybrid keyword detection application 105.

Figure 7:
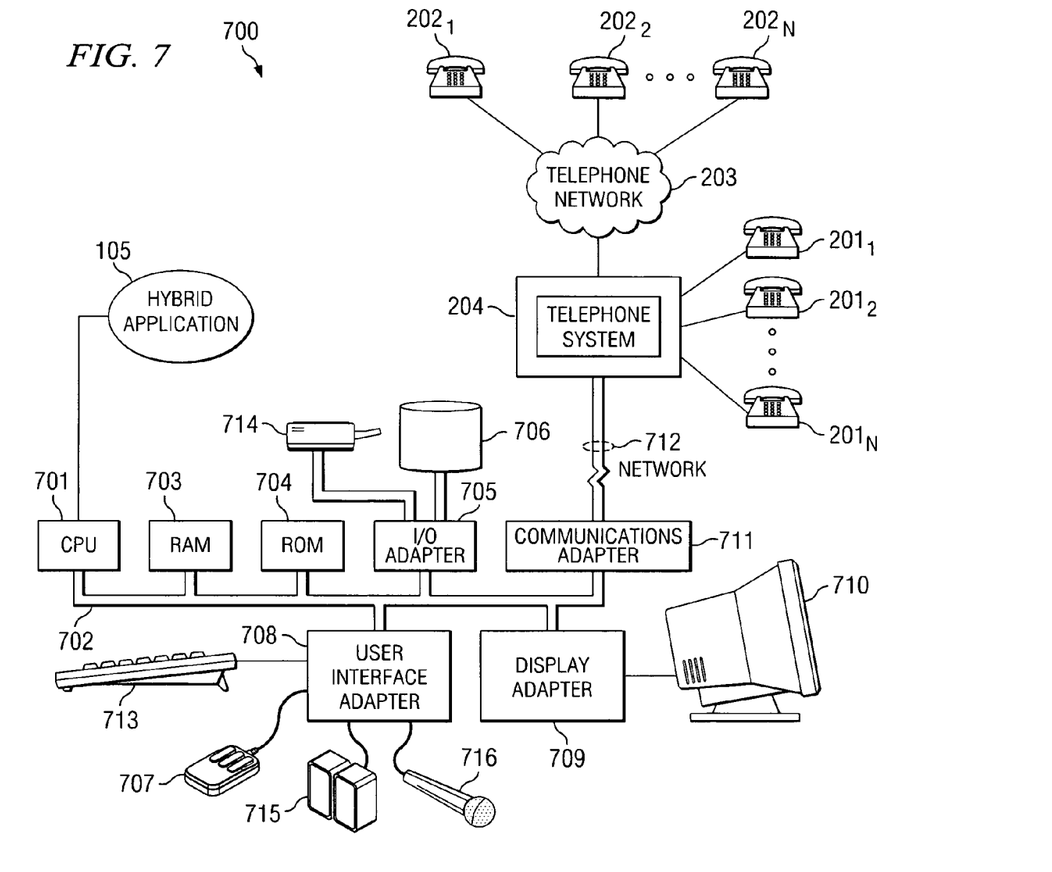
FIG. 7 shows an exemplary computer system adapted to implement one embodiment of the present invention.

FIG. 7 shows an exemplary computer system adapted to implement one embodiment of the present invention. Computer system 700 may, for example, be used to implement hybrid keyword detection server 104 for a controlled-environment facility, such as a correctional facility. Central processing unit (CPU) 701 is coupled to system bus 702. CPU 701 may be any general-purpose CPU. However, the present invention is not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art, such as data for hybrid keyword detection application 105.

Bus 702 is also coupled to input/output (I/O) controller card 705, communications adapter card 711, user interface card 708, and display card 709. I/O adapter card 705 connects to storage devices 706, such as one or more of a hard drive, a CD drive, a floppy disk drive, a tape drive, to the computer system. I/O adapter 705 is also connected to printer 714, which would allow the system to print paper copies of information such as document, photographs, articles, etc. Note that printer 714 may be a printer (e.g. dot matrix, laser, etc.), a fax machine, and/or a copier machine. Communications card 711 is adapted to couple the computer system 700 telephone system 204 or to computer network 305 described above. User interface card 708 couples user input devices, such as keyboard 713, pointing device 707, and microphone 716, to the computer system 700. User interface card 708 also provides sound output to a user via speaker(s) 715. Display card 709 is driven by CPU 701 to control the display on display device 710.

Computer system 700 preferably includes software applications, such as hybrid keyword detection application 105, that run on CPU 701 to control certain aspects of the present invention. Of course, embodiments of the present invention are not limited in application to use on a computer system such as that shown in FIG. 7, but may instead be implemented on any suitable computer system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   capturing audio at a telephone system switch or router for a controlled-environment facility, the audio comprising a voice signal from at least part of a conversation between at least one party within the controlled-environment facility and at least one other party; and
   executing a hybrid keyword detection application on a hybrid keyword detection server, the hybrid keyword detection application receiving the captured audio from the telephone system switch or router and detecting whether at least one predefined keyword is present in the captured audio,
   the hybrid keyword detection application first filtering the captured audio using a phonetic-based algorithm, the phonetic-based algorithm producing a first result comprising conversations potentially containing the predefined keywords, wherein the phonetic-based algorithm allows searches on how the keywords sound, and
   then filtering only the captured audio from the first result using an acoustic-based algorithm to eliminate erroneous keyword detections by the phonetic-based algorithm, wherein the acoustic-based algorithm uses statistical methods to perform keyword detection the acoustic-based algorithm producing a second result; and
   analyzing the first and second results to determine a keyword matching probability.

2. The method of claim 1 wherein said capturing the audio comprises:
   recording the conversation.

3. The method of claim 1 wherein capturing the audio comprises:
   intercepting an ongoing conversation.

4. The method of claim 1 wherein capturing the audio comprises:
   capturing a telephone conversation.

5. The method of claim 1 wherein said capturing audio comprises:
   capturing audio of a plurality of different conversations.

6. The method of claim 5 wherein said executing a hybrid keyword detection application comprises:
   using a phonetic-based algorithm to determine ones of said plurality of different conversations in which said phonetic-based algorithm identifies said at least one predefined keyword as being present; and
   using an acoustic-based algorithm to further analyze said determined ones of said plurality of different conversations to determine those of said determined ones of said plurality of different conversations in which said acoustic-based algorithm identifies said at least one predefined keyword as being present.

7. The method of claim 1 further comprising:
   customizing at least one parameter of the hybrid keyword detection application for a particular controlled-environment facility.

8. The method of claim 1 wherein detecting the keyword comprises:
   determining whether a keyword matching probability is greater than a threshold.

9. The method of claim 1 further comprising:
   executing a predefined action associated with a detected keyword.

10. The method of claim 1 further comprising communicating said captured audio via a Voice over Internet Protocol (VoIP) network to said hybrid keyword detection application.

11. The method of claim 10 further comprising:
    communicating corresponding metadata for said captured audio to said hybrid keyword detection application.

12. A system comprising:
    an audio capture system in a telephone system switch or router operable to capture a voice signal for a conversation conducted between a resident of a controlled-environment facility and another party; and
    a hybrid keyword detection system coupled to the telephone system switch or router and executing a hybrid keyword detection application that is operable to perform phonetic-based keyword detection and acoustic-based keyword detection on the voice signal captured from the telephone system switch or router, wherein the hybrid keyword detection system is operable to detect whether at least one predefined keyword is present in the received voice signal,
    the hybrid keyword detection application first filtering the captured voice signal using a phonetic-based algorithm to identify conversations potentially containing the at least one predefined keyword, the phonetic-based algorithm producing a first result, and
    then filtering only the captured voice signal from the first result using an acoustic-based algorithm to eliminate erroneous keyword detections by the phonetic-based algorithm, the acoustic-based algorithm producing a second result,
    analyzing the first and second results to determine a keyword matching probability, and
    determining whether the keyword match probability is greater than a threshold.

13. The system of claim 12 wherein the audio capture system comprises:
    a controlled-environment facility's telephone system.

14. The system of claim 12 wherein the hybrid keyword detection system further comprises:
    a hybrid keyword detection server; and
    a database communicatively coupled to the hybrid keyword detection server.

15. The system of claim 12 wherein the hybrid keyword detection application is customized for a particular controlled-environment facility.

16. The system of claim 12 wherein detecting whether the at least one predefined keyword is present in the received audio comprises determining whether a keyword matching probability is greater than a threshold.

17. The system of claim 12 wherein said audio system captures audio signals for a plurality of conversations, and wherein said hybrid keyword detection application is operable to:
   a) use a phonetic-based algorithm to determine ones of said plurality of conversations in which said phonetic-based algorithm identifies said at least one predefined keyword as being present; and
   b) use an acoustic-based algorithm to further analyze said determined ones of said plurality of conversations to determine those of said determined ones of said plurality of conversations in which said acoustic-based algorithm identifies said at least one predefined keyword as being present.

18. The system of claim 12 further comprising a Voice over Internet Protocol (VoIP) network over which said captured audio signal is communicated to said hybrid keyword detection system.

19. The system of claim 18 wherein corresponding metadata for said captured audio signal is communicated to said hybrid keyword detection system.

20. The system of claim 12 wherein the audio signal is a recorded conversation.

21. The system of claim 12 wherein the audio signal is an ongoing conversation.

22. The system of claim 12 wherein the audio signal is a telephone conversation.

23. The system of claim 12 further comprising:
   a client communicatively coupled to the hybrid keyword detection system, wherein the hybrid keyword detection system is configurable by said client.

24. The system of claim 12 wherein the hybrid keyword detection system executes an action associated with a detected keyword.

25. The system of claim 24 further comprising:
   a client communicatively coupled to the hybrid keyword detection system, wherein the action associated with a corresponding keyword is configurable by said client.

26. A system comprising:
   a plurality of telephone system switches or routers, wherein each telephone system switches or router is operable to capture voice signals from telephone communications within one of a plurality of geographically distributed controlled-environment facilities; and
   a centralized hybrid keyword detection system connected to each of the plurality of telephone system switches or routers, where the hybrid keyword detection system is operable to use both phonetic-based keyword detection and acoustic-based keyword detection for detecting a keyword within the voice signals captured by the telephone system switches or routers,
      the hybrid keyword detection system first filtering the captured voice signals using a phonetic-based algorithm to identify conversations potentially containing predefined keywords, the phonetic-based algorithm producing a first result,
      then filtering only the captured voice signals within the first result using an acoustic-based algorithm to eliminate erroneous keyword detections by the phonetic-based algorithm, the acoustic-based algorithm producing a second result
      analyzing the first and second result to determining a keyword matching probability, and
      determining whether the keyword matching probability is greater than a threshold.

27. The system of claim 26 where the hybrid keyword detection system comprises:
   a hybrid keyword detection server; and
   a database connected to the hybrid keyword detection server.

28. The system of claim 27 where the hybrid keyword detection server is operable to execute a hybrid application for detecting the keyword.

29. The system of claim 26 where the hybrid keyword detection system is connected to each of the plurality of audio capture systems via a computer network.

30. The system of claim 26 wherein said hybrid keyword detection system uses said phonetic-based keyword detection to determine ones of a plurality of captured audio signals captured by said plurality of audio capture systems in which said phonetic-based keyword detection identifies said keyword as being present; and wherein said keyword detection system further uses said acoustic-based keyword detection to further analyze said determined ones of said plurality of captured audio signals to verify the presence of said keyword therein.

* * * * *